(12) United States Patent
Chen et al.

(10) Patent No.: US 8,934,421 B2
(45) Date of Patent: Jan. 13, 2015

(54) ACKNOWLEDGMENT TRANSMISSIONS UNDER CROSS-SUBFRAME RESOURCE ALLOCATION IN LTE-A

(75) Inventors: Wanshi Chen, San Diego, CA (US); Tao Luo, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 774 days.

(21) Appl. No.: 13/105,424

(22) Filed: May 11, 2011

(65) Prior Publication Data

US 2011/0286406 A1   Nov. 24, 2011

Related U.S. Application Data

(60) Provisional application No. 61/334,129, filed on May 12, 2010.

(51) Int. Cl.
*H04W 4/00* (2009.01)
*H04L 1/18* (2006.01)
*H04L 5/00* (2006.01)

(52) U.S. Cl.
CPC ............ *H04L 1/1861* (2013.01); *H04L 5/0053* (2013.01); *H04L 5/0055* (2013.01); *H04L 5/0048* (2013.01)
USPC ....................................................... 370/329

(58) Field of Classification Search
CPC .... H04L 5/0053; H04L 5/0055; H04L 1/1861
USPC ....................................................... 370/329
See application file for complete search history.

(56) References Cited

U.S. PATENT DOCUMENTS 8,169,956 B2   5/2012  Malladi
2008/0205348 A1*  8/2008  Malladi .......................... 370/335
(Continued)

FOREIGN PATENT DOCUMENTS

CN   101702644 A    5/2010
EP   2242202 A1   10/2010
(Continued)

OTHER PUBLICATIONS

LG Electronics ("Uplink ACK/NACK resource allocation in TDD", Mar. 31, 2008-Apr. 4, 2008; 3GPP Draft; R1-081568 ULACKNACK in TDD REV, 3rd Generation Partnership Project (3GPP)).*
(Continued)

*Primary Examiner* — Noel Beharry
*Assistant Examiner* — Farhad Ali
(74) *Attorney, Agent, or Firm* — Dalei Dong

(57) ABSTRACT

In release 8 of the LTE standard ("Rel-8"), downlink data transmissions of one or more user equipments (UEs) in one subframe may be scheduled by control channels of different subframes. The resources for use in acknowledging whether or not a downlink data transmission was successfully received by a UE may be based on a starting control channel element (CCE) of a corresponding control channel. Two or more control channels of different subframes may have the same starting CCE, which may lead to acknowledgment resource collisions between the one or more UEs. Therefore, certain aspects of the present disclosure provide techniques to avoid acknowledgment resource collisions between the one or more UEs.

60 Claims, 11 Drawing Sheets

(56) References Cited

U.S. PATENT DOCUMENTS

| | | | |
|---|---|---|---|
| 2009/0245194 A1 | 10/2009 | Damnjanovic et al. | |
| 2010/0150081 A1 | 6/2010 | Gao et al. | |
| 2011/0044239 A1 | 2/2011 | Cai et al. | |
| 2011/0064037 A1 | 3/2011 | Wei et al. | |
| 2011/0310856 A1* | 12/2011 | Hariharan et al. | 370/336 |
| 2012/0039285 A1* | 2/2012 | Seo et al. | 370/329 |

FOREIGN PATENT DOCUMENTS

| | | |
|---|---|---|
| JP | 2009272827 A | 11/2009 |
| JP | 2011517168 A | 5/2011 |
| WO | 2008092160 | 7/2008 |
| WO | WO-2009116754 A2 | 9/2009 |
| WO | WO-2009154839 A2 | 12/2009 |
| WO | WO 2010101411 A2 | 9/2010 |

OTHER PUBLICATIONS

3rd Generation Partnership Project; Technical Specification Group Radio Access Network; Evolved Universal Terrestrial Radio Access (E-UTRA); Physical layer procedures (Release 9), 3GPP Standard; 3GPP TS 36.213, 3rd Generation Partnership Project (3GPP), Mobile Competence Centre; 650, Route Des Lucioles; F-06921 Sophia-Antipolis Cedex; France, No. V9.1.0, Mar. 21, 2010, pp. 1-83, XP050401971, [retrieved on Mar. 21, 2010].

Catt: "TTI bundling in TDD", 3GPP Draft; R2-082308_TTI Bundling in TDD 3rd Generation Partnership Project (3GPP), Mobile Competence Centre; 650, Route Des Lucioles; F-06921 Sophia-Antipolis Cedex; France,. vol. RAN WG2, no. Kansas City, USA; 20080429, Apr. 29, 2008, XP050140055, [retrieved on Apr. 29, 2008].

International Search Report and Written Opinion—PCT/US2011/036331, ISA/EPO—Sep. 8, 2011.

LG Electronics: "Uplink ACK/NACK resource allocation in TDD", 3GPP Draft; R1-081568 UL ACKNACK in TDD.REV, 3rd Generation Partnership Project (3GPP), Mobile Competence Centre; 650, Route Des Lucioles; F-06921 Sophia-Antipolis Cedex; France, vol. RAN WGI, no. Shenzhen, China; 20080409, Apr. 9, 2008, XP050109983, [retrieved on Apr. 9, 2008].

Samsung et al.,"UL ACK/NACK resource indication for DL persistent scheduling", 3GPP Draft; R1-080681 UL Persistent ACKNACK Indication and Use, 3rd Generation Partnership Project (3GPP), Mobile Competence Centre; 650, Route Des Lucioles; F-06921 Sophia-Antipolis Cedex; France, vol. RAN WGI, no. Sorrento, Italy; 20080205, Feb. 5, 2008, XP050109177, [retrieved on Feb. 5, 2008].

LG Electronics: "Uplink ACK/NACK resource allocation in TDD," 3GPP TSG RAN WG1 #52bis, R1-081257, Mar. 31, 2008.

* cited by examiner

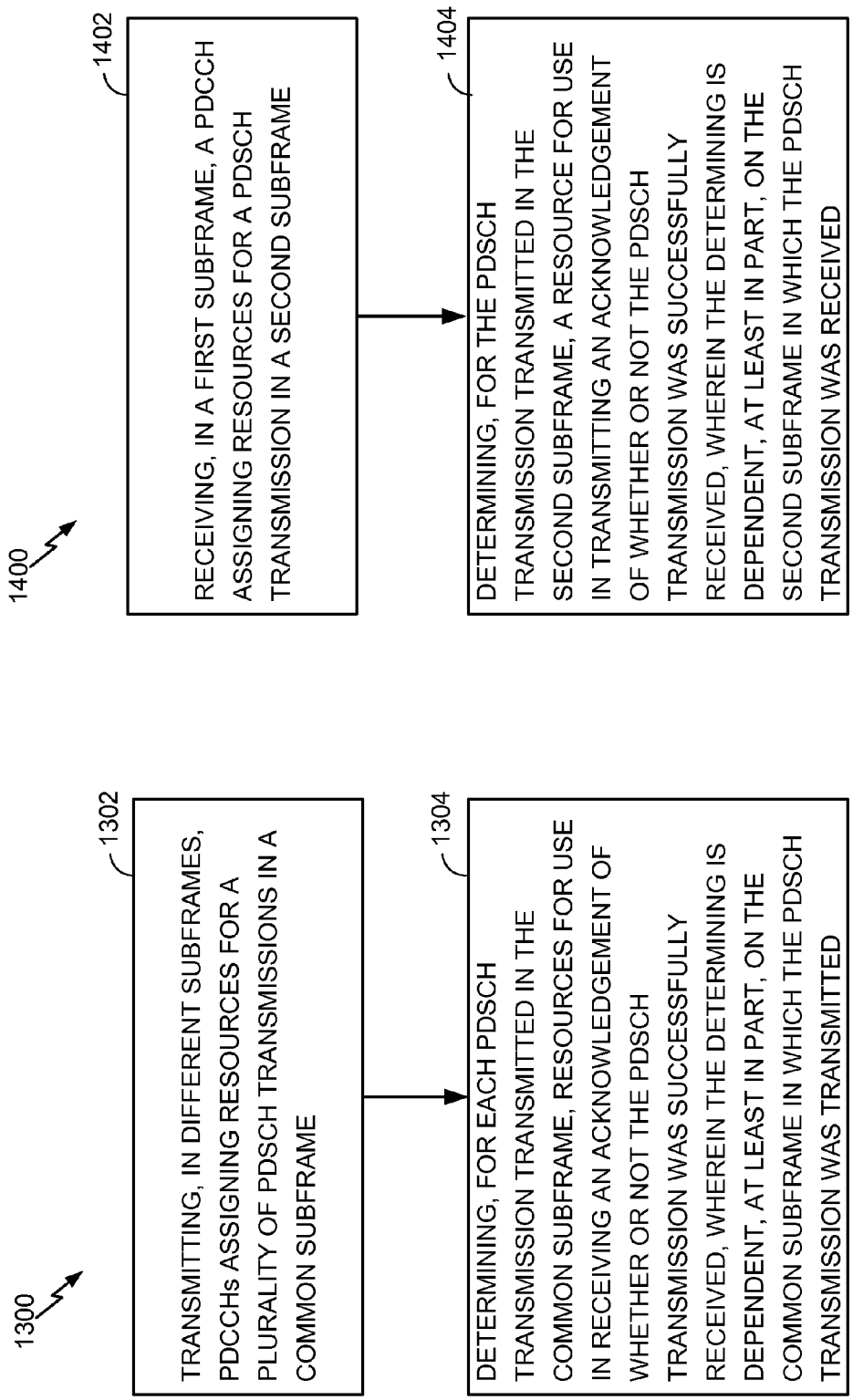

US 8,934,421 B2

ACKNOWLEDGMENT TRANSMISSIONS UNDER CROSS-SUBFRAME RESOURCE ALLOCATION IN LTE-A

CROSS-REFERENCE TO RELATED APPLICATION

This application claims priority to U.S. Provisional Application Ser. No. 61/334,129, entitled, "APPARATUS AND METHOD FOR ACK/ANK TRANSMISSION UNDER CROSS-FRAME RESOURCE ALLOCATION", filed on May 12, 2010, which is expressly incorporated by reference herein in its entirety.

BACKGROUND

I. Field

The present disclosure relates generally to communication, and more specifically to a method for deriving acknowledgment resources under cross-subframe resource allocation.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

Certain aspects of the present disclosure provide a method for wireless communications. The method generally includes transmitting, in different subframes, physical downlink control channels (PDCCHs) assigning resources for a plurality of physical downlink shared channel (PDSCH) transmissions in a common subframe and determining, for each PDSCH transmission transmitted in the common subframe, resources for use in receiving an acknowledgement (ACK) of whether or not the PDSCH transmission was successfully received, wherein the determining is dependent, at least in part, on a subframe in which the PDCCH was transmitted.

Certain aspects of the present disclosure provide an apparatus for wireless communications. The apparatus generally includes means for transmitting, in different subframes, physical downlink control channels (PDCCHs) assigning resources for a plurality of physical downlink shared channel (PDSCH) transmissions in a common subframe and means for determining, for each PDSCH transmission transmitted in the common subframe, resources for use in receiving an acknowledgement (ACK) of whether or not the PDSCH transmission was successfully received, wherein the determining is dependent, at least in part, on a subframe in which the PDCCH was transmitted.

Certain aspects of the present disclosure provide an apparatus for wireless communications. The apparatus generally includes at least one processor configured to transmit, in different subframes, physical downlink control channels (PDCCHs) assigning resources for a plurality of physical downlink shared channel (PDSCH) transmissions in a common subframe and determine, for each PDSCH transmission transmitted in the common subframe, resources for use in receiving an acknowledgement (ACK) of whether or not the PDSCH transmission was successfully received, wherein the determining is dependent, at least in part, on a subframe in which the PDCCH was transmitted.

Certain aspects provide a computer-program product for wireless communications. The computer-program product typically includes a computer-readable medium having instructions stored thereon, the instructions being executable by one or more processors. The instructions generally include code for transmitting, in different subframes, physical downlink control channels (PDCCHs) assigning resources for a plurality of physical downlink shared channel (PDSCH) transmissions in a common subframe and code for determining, for each PDSCH transmission transmitted in the common subframe, resources for use in receiving an acknowledgement (ACK) of whether or not the PDSCH transmission was successfully received, wherein the determining is dependent, at least in part, on a subframe in which the PDCCH was transmitted.

Certain aspects of the present disclosure provide a method for wireless communications. The method generally includes transmitting, in different subframes, PDCCHs assigning resources for a plurality of PDSCH transmissions in a common subframe and determining, for each PDSCH transmission transmitted in the common subframe, resources for use in receiving an ACK of whether or not the PDSCH transmission was successfully received, wherein the determining is dependent, at least in part, on the common subframe in which the PDSCH transmission was transmitted.

Certain aspects of the present disclosure provide an apparatus for wireless communications. The apparatus generally includes means for transmitting, in different subframes, physical downlink control channels (PDCCHs) assigning resources for a plurality of physical downlink shared channel (PDSCH) transmissions in a common subframe and means for determining, for each PDSCH transmission transmitted in the common subframe, resources for use in receiving an acknowledgement (ACK) of whether or not the PDSCH transmission was successfully received, wherein the determining is dependent, at least in part, on the common subframe in which the PDSCH transmission was transmitted.

Certain aspects of the present disclosure provide an apparatus for wireless communications. The apparatus generally includes at least one processor configured to transmit, in different subframes, physical downlink control channels (PDCCHs) assigning resources for a plurality of physical downlink shared channel (PDSCH) transmissions in a common subframe and determine, for each PDSCH transmission transmitted in the common subframe, resources for use in receiving an acknowledgement (ACK) of whether or not the PDSCH transmission was successfully received, wherein the determining is dependent, at least in part, on the common subframe in which the PDSCH transmission was transmitted.

Certain aspects provide a computer-program product for wireless communications. The computer-program product typically includes a computer-readable medium having instructions stored thereon, the instructions being executable by one or more processors. The instructions generally include code for transmitting, in different subframes, physical downlink control channels (PDCCHs) assigning resources for a plurality of physical downlink shared channel (PDSCH) transmissions in a common subframe and code for determining, for each PDSCH transmission transmitted in the common subframe, resources for use in receiving an acknowledgement (ACK) of whether or not the PDSCH transmission was successfully received, wherein the determining is dependent, at least in part, on the common subframe in which the PDSCH transmission was transmitted.

Certain aspects of the present disclosure provide a method for wireless communications. The method generally includes receiving, in a first subframe, a PDCCH assigning resources for a PDSCH transmission in a second subframe, wherein the first subframe is different from the second subframe and determining, for the PDSCH transmission transmitted in the second subframe, a resource in a third subframe for use in transmitting an ACK of whether or not the PDSCH transmission was successfully received, wherein the determining is dependent, at least in part, on the first subframe in which the PDCCH was received.

Certain aspects of the present disclosure provide an apparatus for wireless communications. The apparatus generally includes means for receiving, in a first subframe, a physical downlink control channel (PDCCH) assigning resources for a physical downlink shared channel (PDSCH) transmission in a second subframe, wherein the first subframe is different from the second subframe and means for determining, for the PDSCH transmission transmitted in the second subframe, a resource in a third subframe for use in transmitting an acknowledgement (ACK) of whether or not the PDSCH transmission was successfully received, wherein the determining is dependent, at least in part, on the first subframe in which the PDCCH was received.

Certain aspects of the present disclosure provide an apparatus for wireless communications. The apparatus generally includes at least one processor configured to receive, in a first subframe, a physical downlink control channel (PDCCH) assigning resources for a physical downlink shared channel (PDSCH) transmission in a second subframe, wherein the first subframe is different from the second subframe and determine, for the PDSCH transmission transmitted in the second subframe, a resource in a third subframe for use in transmitting an acknowledgement (ACK) of whether or not the PDSCH transmission was successfully received, wherein the determining is dependent, at least in part, on the first subframe in which the PDCCH was received.

Certain aspects provide a computer-program product for wireless communications. The computer-program product typically includes a computer-readable medium having instructions stored thereon, the instructions being executable by one or more processors. The instructions generally include code for receiving, in a first subframe, a physical downlink control channel (PDCCH) assigning resources for a physical downlink shared channel (PDSCH) transmission in a second subframe, wherein the first subframe is different from the second subframe and code for determining, for the PDSCH transmission transmitted in the second subframe, a resource in a third subframe for use in transmitting an acknowledgement (ACK) of whether or not the PDSCH transmission was successfully received, wherein the determining is dependent, at least in part, on the first subframe in which the PDCCH was received.

Certain aspects of the present disclosure provide a method for wireless communications. The method generally includes receiving, in a first subframe, a PDCCH assigning resources for a PDSCH transmission in a second subframe and determining, for the PDSCH transmission transmitted in the second subframe, a resource for use in transmitting an ACK of whether or not the PDSCH transmission was successfully received, wherein the determining is dependent, at least in part, on the second subframe in which the PDSCH transmission was received.

Certain aspects of the present disclosure provide an apparatus for wireless communications. The apparatus generally includes means for receiving, in a first subframe, a physical downlink control channel (PDCCH) assigning resources for a physical downlink shared channel (PDSCH) transmission in a second subframe and means for determining, for the PDSCH transmission transmitted in the second subframe, a resource for use in transmitting an acknowledgement (ACK) of whether or not the PDSCH transmission was successfully received, wherein the determining is dependent, at least in part, on the second subframe in which the PDSCH transmission was received.

Certain aspects of the present disclosure provide an apparatus for wireless communications. The apparatus generally includes at least one processor configured to receive, in a first subframe, a physical downlink control channel (PDCCH) assigning resources for a physical downlink shared channel (PDSCH) transmission in a second subframe and determine, for the PDSCH transmission transmitted in the second subframe, a resource for use in transmitting an acknowledgement (ACK) of whether or not the PDSCH transmission was successfully received, wherein the determining is dependent, at least in part, on the second subframe in which the PDSCH transmission was received.

Certain aspects provide a computer-program product for wireless communications. The computer-program product typically includes a computer-readable medium having instructions stored thereon, the instructions being executable by one or more processors. The instructions generally include code for receiving, in a first subframe, a physical downlink control channel (PDCCH) assigning resources for a physical downlink shared channel (PDSCH) transmission in a second subframe and code for determining, for the PDSCH transmission transmitted in the second subframe, a resource for use in transmitting an acknowledgement (ACK) of whether or not the PDSCH transmission was successfully received, wherein the determining is dependent, at least in part, on the second subframe in which the PDSCH transmission was received.

BRIEF DESCRIPTION OF THE DRAWINGS

FIG. 13 illustrates example operations for determining resources for use in receiving an ACK/NAK for an associated PDSCH transmission in an effort to avoid ACK/NAK resource collisions, in accordance with certain aspects of the present disclosure.

FIG. 14 illustrates example operations for determining resources for use in transmitting an ACK/NAK for an associated PDSCH transmission in an effort to avoid ACK/NAK resource collisions, in accordance with certain aspects of the present disclosure.

DETAILED DESCRIPTION

In release 8 of the LTE standard ("Rel-8"), downlink data transmissions of one or more user equipments (UEs) in one subframe may be scheduled by control channels of different subframes. The resources for use in acknowledging whether or not a downlink data transmission was successfully received by a UE may be based on a starting control channel element (CCE) of a corresponding control channel. Two or more control channels of different subframes may have the same starting CCE, which may lead to acknowledgment resource collisions between the one or more UEs. Therefore, certain aspects of the present disclosure provide techniques to avoid acknowledgment resource collisions between the one or more UEs.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
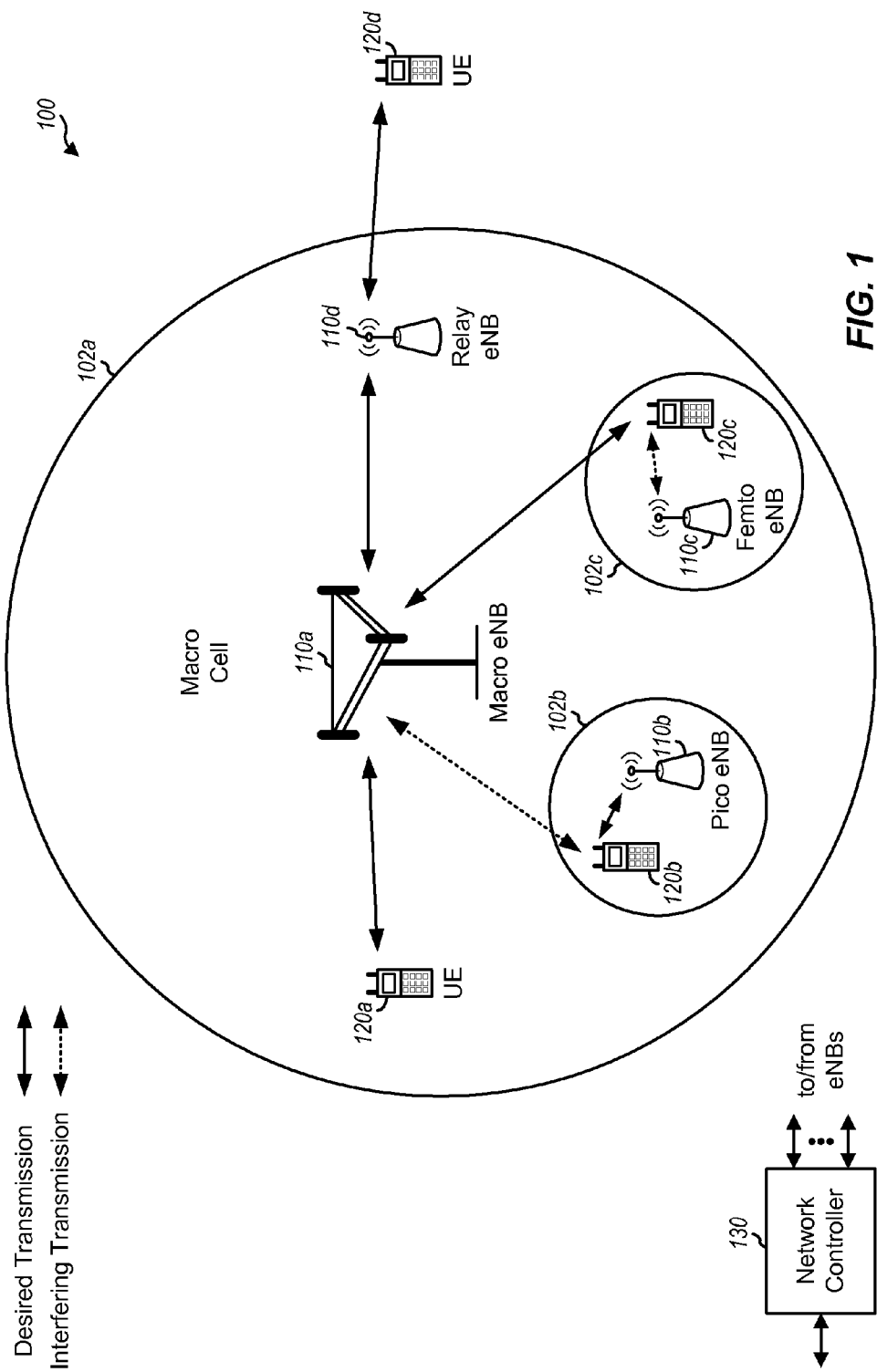
FIG. 1 is a block diagram conceptually illustrating an example of a wireless communications network in accordance with certain aspects of the present disclosure.

FIG. 1 shows a wireless communication network 100 in which procedures described for the determination of ACK/NAK resources may be performed. The network 100 may be an LTE network or some other wireless network. Wireless network 100 may include a number of evolved Node Bs (eNBs) 110 and other network entities. An eNB is an entity that communicates with UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

As will be described in greater detail below, according to certain aspects, eNBs may perform inter-cell interference coordination (ICIC). ICIC may involve negotiation between eNBs to achieve resource coordination/partitioning to allocate resources to an eNB located near the vicinity of a strong interfering eNB. The interfering eNB may avoid transmitting on the allocated/protected resources, possibly except for a CRS. A UE can then communicate with the eNB on the protected resources in the presence of the interfering eNB and may observe no interference (possibly except for the CRS) from the interfering eNB UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

Figure 2:
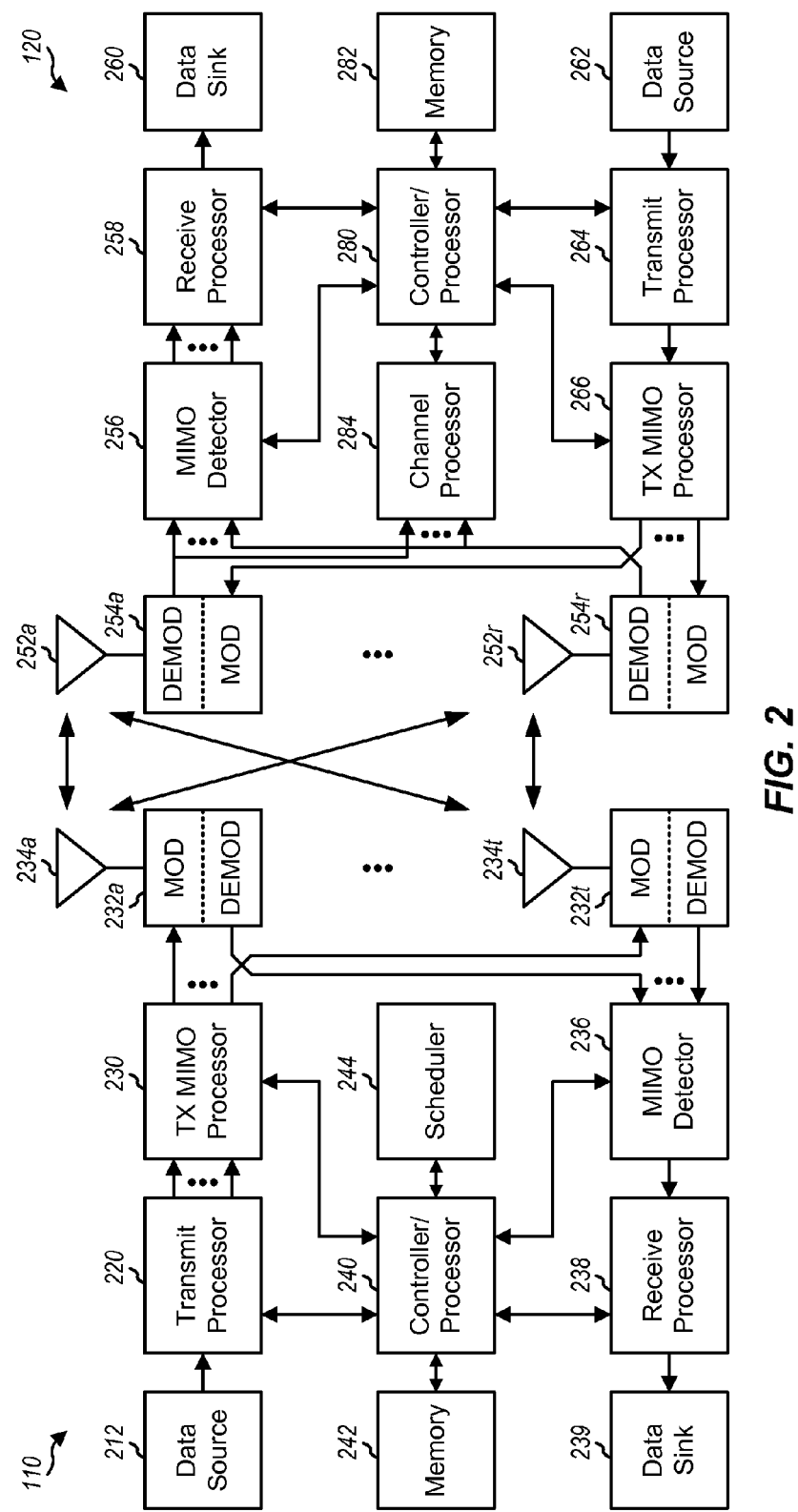
FIG. 2 shows a block diagram conceptually illustrating an example of a Node B in communication with a user equipment device (UE) in a wireless communications network in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor 284 may determine RSRP, RSSI, RSRQ, CQI, etc., as described below.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240.

Controllers/processors 240 and 280 may direct the operation at base station 110 and UE 120, respectively. Processor 240 and/or other processors and modules at base station 110 may perform or direct operations for configuring a UE for various random access procedures and identify one or more attributes during such procedures, as described herein. For example, processor 280 and/or other processors and modules at UE 120 may perform or direct operations for various random access procedures described herein. Memories 242 and 282 may store data and program codes for base station 110 and UE 120, respectively. A scheduler 244 may schedule UEs for data transmission on the downlink and/or uplink.

Figure 3:
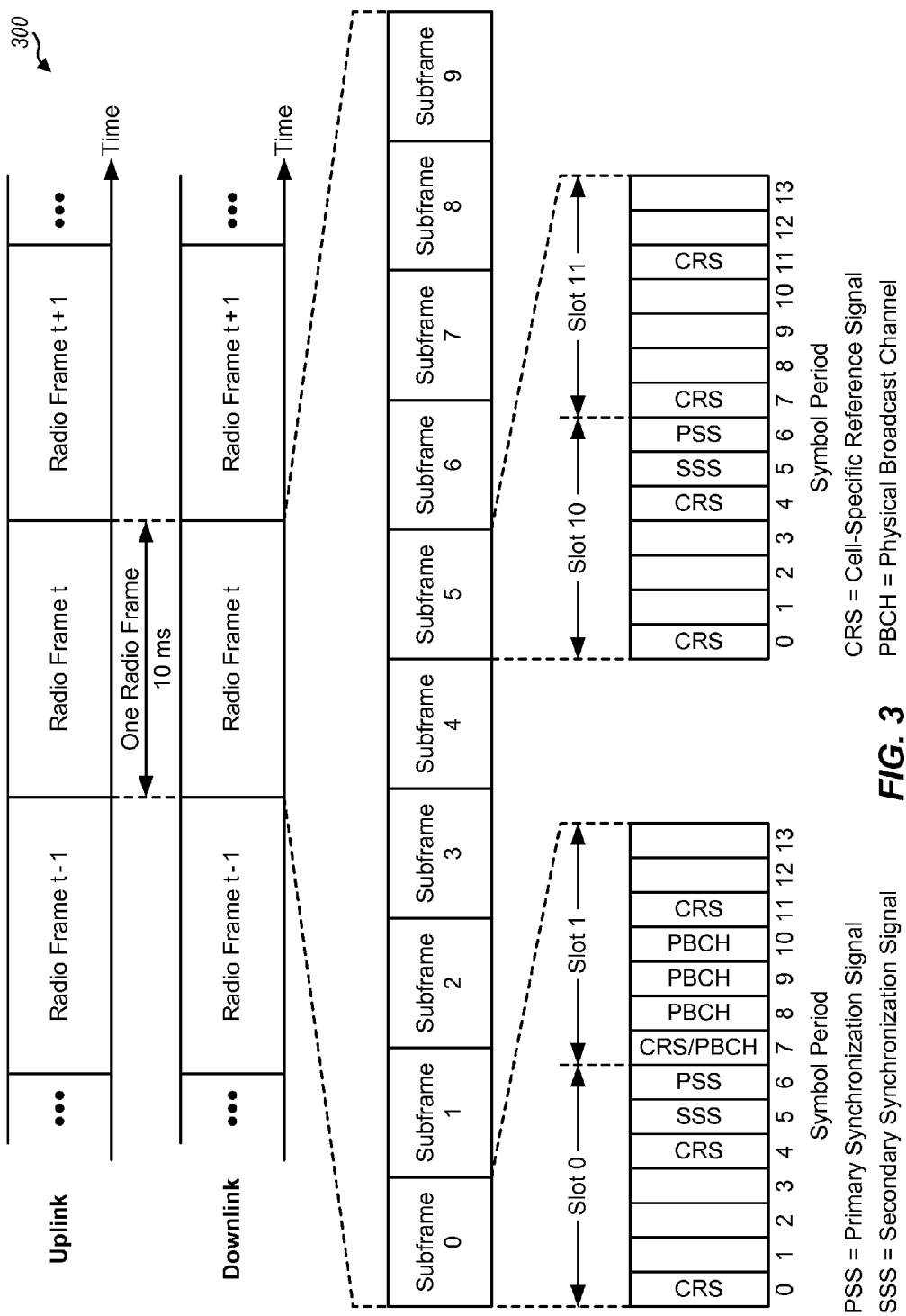
FIG. 3 is a block diagram conceptually illustrating an example of a frame structure in a wireless communications network in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

Figure 4:
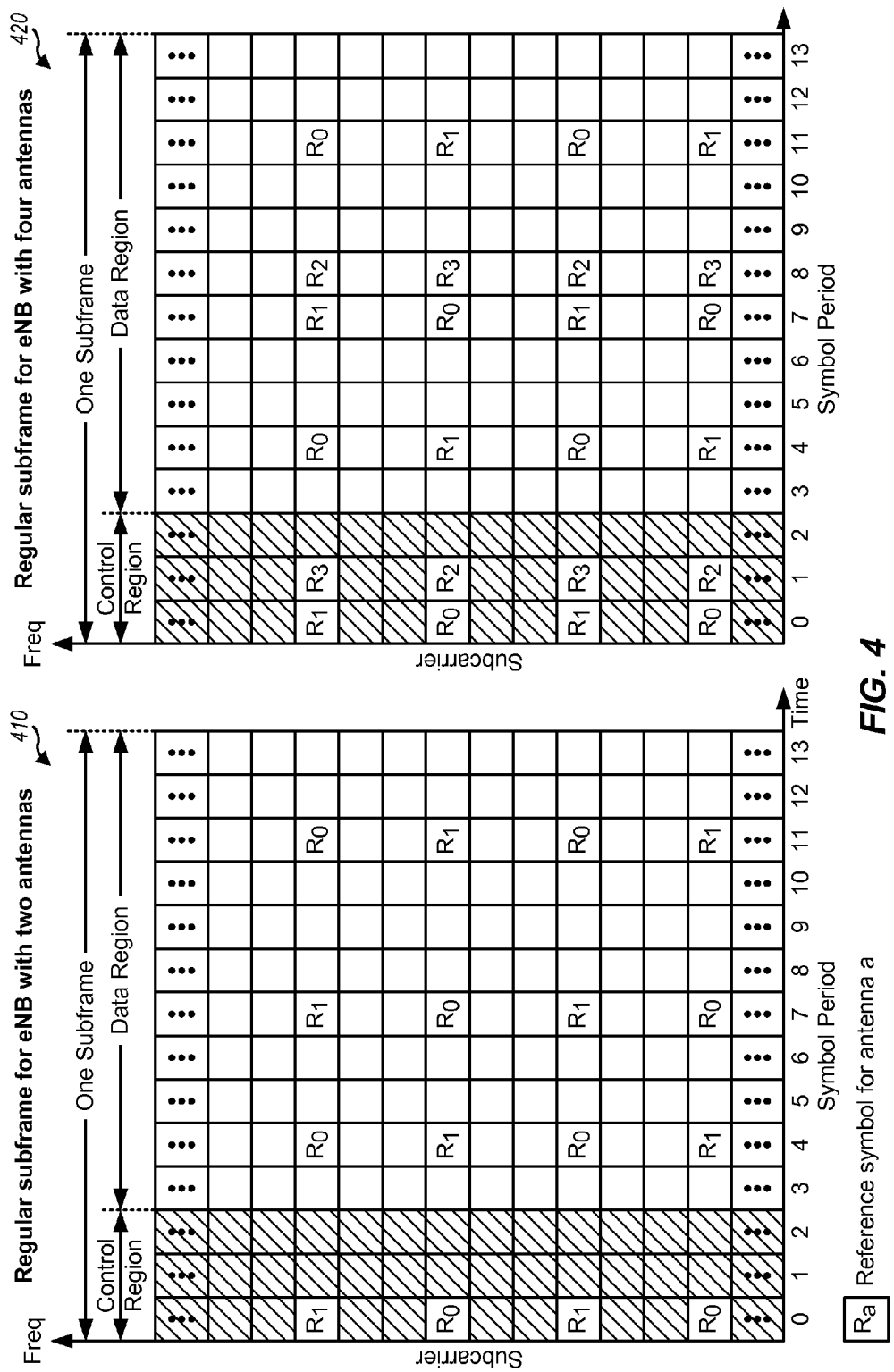
FIG. 4 illustrates two exemplary subframe formats for the downlink with the normal cyclic prefix in accordance with certain aspects of the present disclosure.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Figure 5:
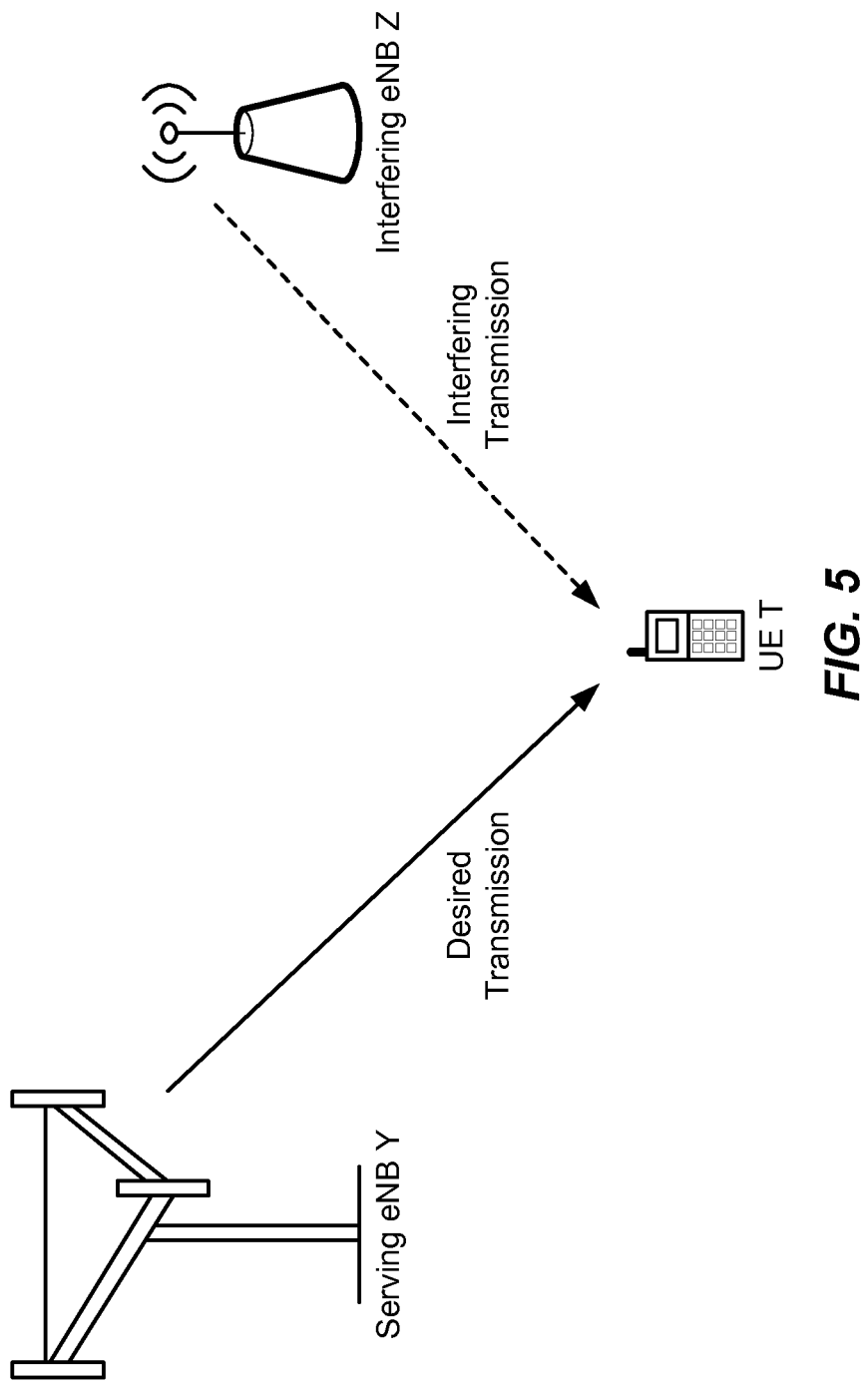
FIG. 5 illustrates an exemplary dominant interference scenario in accordance with certain aspects of the present disclosure.

FIG. 5 shows an exemplary dominant interference scenario. In the example shown in FIG. 5, a UE T may communicate with a serving eNB Y and may observe high interference from a strong/dominant interfering eNB Z.

A dominant interference scenario may occur due to restricted association. For example, in FIG. 5, eNB Y may be a macro eNB, and eNB Z may be a femto eNB. UE T may be located close to femto eNB Z and may have high received power for eNB Z. However, UE T may not be able to access femto eNB Z due to restricted association and may then connect to macro eNB Y with lower received power. UE T may then observe high interference from femto eNB Z on the downlink and may also cause high interference to femto eNB Z on the uplink.

A dominant interference scenario may also occur due to range extension, which is a scenario in which a UE connects to an eNB with lower pathloss and possibly lower SINR among all eNBs detected by the UE. For example, in FIG. 5, eNB Y may be a pico eNB, and interfering eNB Z may be a macro eNB. UE T may be located closer to pico eNB Y than macro eNB Z and may have lower pathloss for pico eNB Y. However, UE T may have lower received power for pico eNB Y than macro eNB Z due to a lower transmit power level of pico eNB Y as compared to macro eNB Z. Nevertheless, it may be desirable for UE T to connect to pico eNB Y due to the lower pathloss. This may result in less interference to the wireless network for a given data rate for UE T.

In general, a UE may be located within the coverage of any number of eNBs. One eNB may be selected to serve the UE, and the remaining eNBs may be interfering eNBs. The UE may thus have any number of interfering eNBs. For clarity, much of the description assumes the scenario shown in FIG. 5 with one serving eNB Y and one interfering eNB Z.

Communication in a dominant interference scenario may be supported by performing inter-cell interference coordination (ICIC). According to certain aspects of ICIC, resource coordination/partitioning may be performed to allocate resources to an eNB located near the vicinity of a strong interfering eNB. The interfering eNB may avoid transmitting on the allocated/protected resources, possibly except for a CRS. A UE can then communicate with the eNB on the protected resources in the presence of the interfering eNB and may observe no interference (possibly except for the CRS) from the interfering eNB.

In general, time and/or frequency resources may be allocated to eNBs via resource partitioning. According to certain aspects, the system bandwidth may be partitioned into a number of subbands, and one or more subbands may be allocated to an eNB. In another design, a set of subframes may be allocated to an eNB. In yet another design, a set of resource blocks may be allocated to an eNB. For clarity, much of the description below assumes a time division multiplex (TDM) resource partitioning design in which one or more interlaces may be allocated to an eNB. The subframes of the allocated interlace(s) may observe reduced or no interference from strong interfering eNBs.

Figure 6:
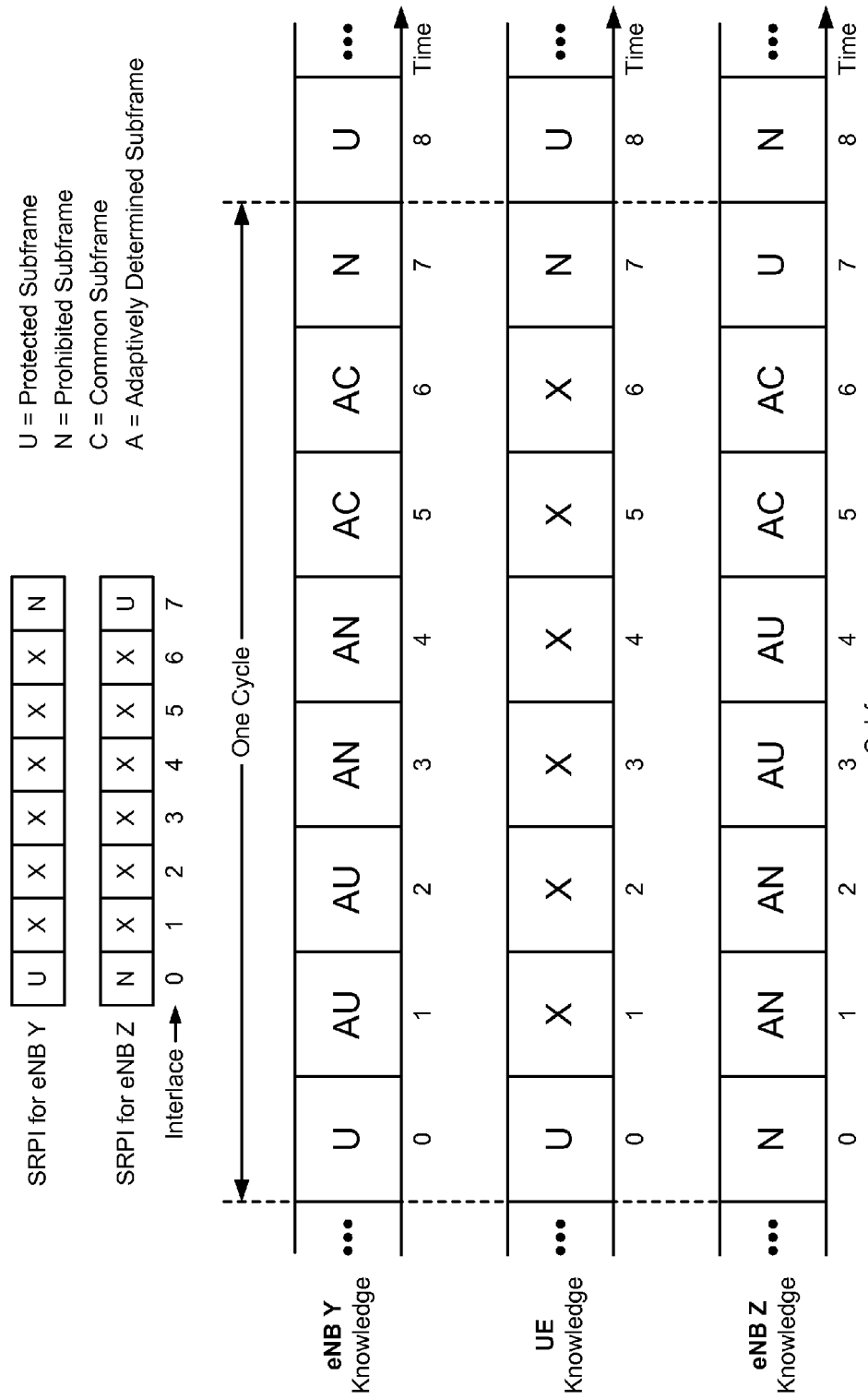
FIG. 6 illustrates example cooperative partitioning of subframes in a heterogeneous network in accordance with certain aspects of the present disclosure.

FIG. 6 shows an example of TDM resource partitioning to support communication in the dominant interference scenario in FIG. 5. In the example shown in FIG. 6, eNB Y may be allocated interlace 0, and eNB Z may be allocated interlace 7 in a semi-static or static manner, e.g., via negotiation between the eNBs through the backhaul. eNB Y can transmit data in subframes of interlace 0 and may avoid transmitting data in subframes of interlace 7. Conversely, eNB Z can transmit data in subframes of interlace 7 and may avoid transmitting data in subframes of interlace 0. The subframes of the remaining interlaces 1 through 6 may be adaptively/dynamically allocated to eNB Y and/or eNB Z.

Table 1 lists different types of subframes in accordance with one design. From the perspective of eNB Y, an interlace allocated to eNB Y may include "protected" subframes (U subframes) that can be used by eNB Y and having little or no interference from interfering eNBs. An interlace allocated to another eNB Z may include "prohibited" subframes (N subframes) that cannot be used by eNB Y for data transmission. An interlace not allocated to any eNB may include "common" subframes (C subframes) that can be used by different eNBs. A subframe that is adaptively allocated is denoted with an "A" prefix and may be a protected subframe (AU subframe), or a prohibited subframe (AN subframe), or a common subframe (AC subframe). The different types of subframes may also be referred to by other names. For example, a protected subframe may be referred to as a reserved subframe, an allocated subframe, etc.

TABLE 1

Subframe Types

| Subframe Type | Description | Expected CQI |
| --- | --- | --- |
| U | Protected subframe that can be used for data transmission and having reduced or no interference from interfering eNBs. | High CQI |
| N | Prohibited subframe that cannot be used for data transmission. | Low CQI |
| C | Common subframe that can be used for data transmission by different eNBs. | High or Low CQI |

According to certain aspects, an eNB may transmit static resource partitioning information (SRPI) to its UEs. According to certain aspects, the SRPI may comprise Q fields for the Q interlaces. The field for each interlace may be set to "U" to indicate the interlace being allocated to the eNB and including U subframes, or to "N" to indicate the interlace being allocated to another eNB and including N subframes, or to "X" to indicate the interlace being adaptively allocated to any eNB and including X subframes. A UE may receive the SRPI from the eNB and can identify U subframes and N subframes for the eNB based on the SRPI. For each interlace marked as "X" in the SRPI, the UE may not know whether the X subframes in that interlace will be AU subframes, or AN subframes, or AC subframes. The UE may know only the semi-static part of the resource partitioning via the SRPI whereas the eNB may know both the semi-static part and adaptive part of the resource partitioning. In the example shown in FIG. 6, the SRPI for eNB Y may include "U" for interlace 0, "N" for interlace 7, and "X" for each remaining interlace. The SRPI for eNB Z may include "U" for interlace 7, "N" for interlace 0, and "X" for each remaining interlace.

A UE may estimate received signal quality of a serving eNB based on a CRS from the serving eNB. The UE may determine CQI based on the received signal quality and may report the CQI to the serving eNB. The serving eNB may use the CQI for link adaptation to select a modulation and coding scheme (MCS) for data transmission to the UE. Different types of subframes may have different amounts of interference and hence may have very different CQIs. In particular, protected subframes (e.g., U and AU subframes) may be characterized by better CQI since dominant interfering eNBs do not transmit in these subframes. In contrast, CQI may be much worse for other subframes (e.g., N, AN and AC subframes) in which one or more dominant interfering eNBs can transmit. From the point of view of CQI, AU subframes may be equivalent to U subframes (both are protected), and AN subframes may be equivalent to N subframes (both are prohibited). AC subframes may be characterized by a completely different CQI. To achieve good link adaptation performance, the serving eNB should have relatively accurate CQI for each subframe in which the eNB transmits traffic data to the UE.

Acknowledgment Transmissions Under Cross-Subframe Resource Allocation in LTE-A

In release 8 of the LTE standard ("Rel-8"), there may be fixed timing relationships between several uplink and downlink transmissions. For example, there may be an offset of 0 ms between the physical downlink control channel (PDCCH) and the physical downlink shared channel (PDSCH). In other words, for a downlink data assignment (e.g., PDSCH), the control channel (e.g., PDCCH) may appear in the same subframe (i.e., same-subframe scheduling). In another example, there may be an offset of 4 ms between a PDSCH transmission and an acknowledgment (ACK/NAK) signal in frequency division duplex (FDD) mode and an offset of at least 4 ms between the PDSCH transmission and the ACK/NAK signal in time division duplex (TDD) mode. In other words, the corresponding ACK/NAK signal for a PDSCH transmission may have a fixed timing relationship.

For certain aspects of the present disclosure, on a per user equipment (UE) basis, for FDD mode, there may be a one-to-one mapping between a PDSCH transmission and an ACK/NAK signal. However, for TDD mode, there may be a one-to-one and many-to-one mapping between the PDSCH transmission and the ACK/NAK signal, depending on the TDD configuration.

In Rel-8, a control channel (e.g., PDCCH) and its associated data channel for downlink (e.g., PDSCH) may be found in the same subframe (i.e., same-subframe scheduling). However, decoding of the control channel may be difficult if there is strong interference from different cells (e.g., due to interference from strong/dominant interfering cells). Communication in a dominant interference scenario may be supported by performing inter-cell interference coordination (ICIC), as discussed above. For example, cells may partition subframes to avoid interference. Partitioning may be static, semi-static, pre-configured, or dynamically configured through signaling. For some embodiments of the present disclosure, allocating resources for a downlink data channel on one subframe may come from a PDCCH on a different subframe, which can be referred to as a cross-subframe assignment.

Figure 7:
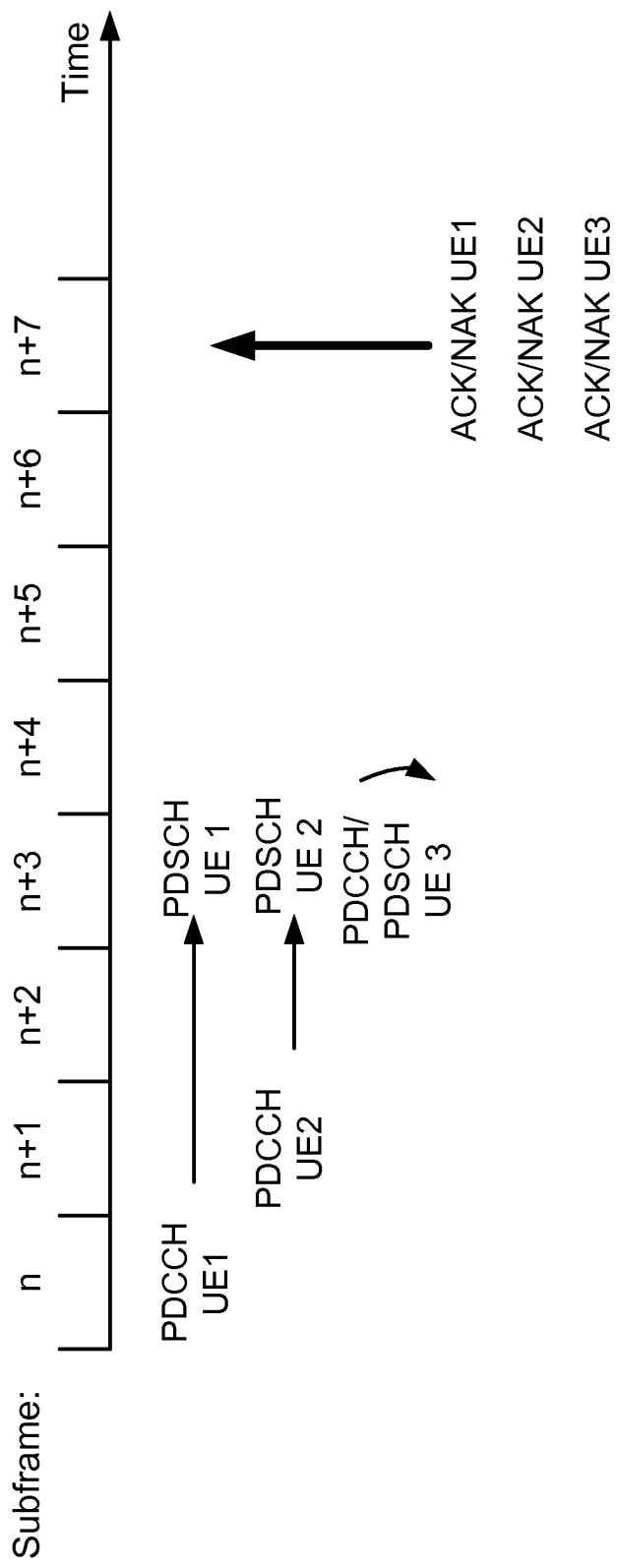
FIG. 7 illustrates cross-subframe scheduling and same-subframe scheduling for a plurality of UEs, in accordance with certain aspects of the present disclosure.

FIG. 7 illustrates cross-subframe scheduling and same-subframe scheduling for a plurality of UEs, in accordance with certain aspects of the present disclosure. UE1 may receive a PDCCH at subframe n for a PDSCH transmission at subframe n+3 (cross-subframe scheduling). UE2 may receive a PDCCH at subframe n+1 for a PDSCH transmission at subframe n+3 (cross-subframe scheduling). UE3 may receive a PDCCH at subframe n+3 for a PDSCH transmission at the same subframe (same-subframe scheduling). As described above, with respect to the fixed timing relationship, corresponding ACK/NAK signals for each PDSCH transmission may be transmitted at subframe n+7 (i.e., 4 ms delay from PDSCH transmissions).

In Rel-8, for dynamic PDSCH scheduling, the ACK/NAK resource may be derived based on the first control channel element (CCE) of a corresponding PDCCH ($n_{CCE}$) and a layer 3 cell-specific parameter ($N_{PUCCH}^{(1)}$). For example, the ACK/NAK resource index may be given by:

$$n_{PUCCH}^{(1)} = n_{CCE} + N_{PUCCH}^{(1)}$$

For semi-persistently scheduled (SPS) PDSCH, the ACK/NAK resource may be layer 3 configured. For example, layer 3 may configure four possible ACK/NAK resources. When SPS is activated via a PDCCH, a 2-bit field in the PDCCH may indicate which ACK/NAK resource is in use for the activated SPS.

For dynamic PDSCH scheduling, the PDSCH transmissions of different UEs in one subframe (i.e., common subframe) may be scheduled by PDCCHs of different subframes, as described in FIG. 7. Since the first CCE of each PDCCH may be used for ACK/NAK resource derivation, two or more PDCCHs of different subframes may have the same starting CCE and, consequently, the same mapped ACK/NAK resource, which may result in an ACK/NAK resource collision. For example, referring to FIG. 7, PDCCH of UE1 in subframe n may have a starting CCE index 5 and PDCCH of UE3 in subframe n+3 may also have starting CCE index 5 as well, which may lead to an ACK/NAK resource collision between UE1 (cross-subframe scheduled) and UE3 (same-subframe scheduled). As another example, ACK/NAK resource collision may occur between two cross-subframe scheduled UEs as well (e.g., UE1 and UE2 in the example illustrated in FIG. 7). For SPS PDSCH, where ACK/NAK resources may be layer 3 configured, as long as the activated ACK/NAKs are not colliding, the collision issue for SPS ACK/NAKs may be avoided. Embodiments of the present disclosure provide methods to avoid ACK/NAK resource collisions.

Figure 8:
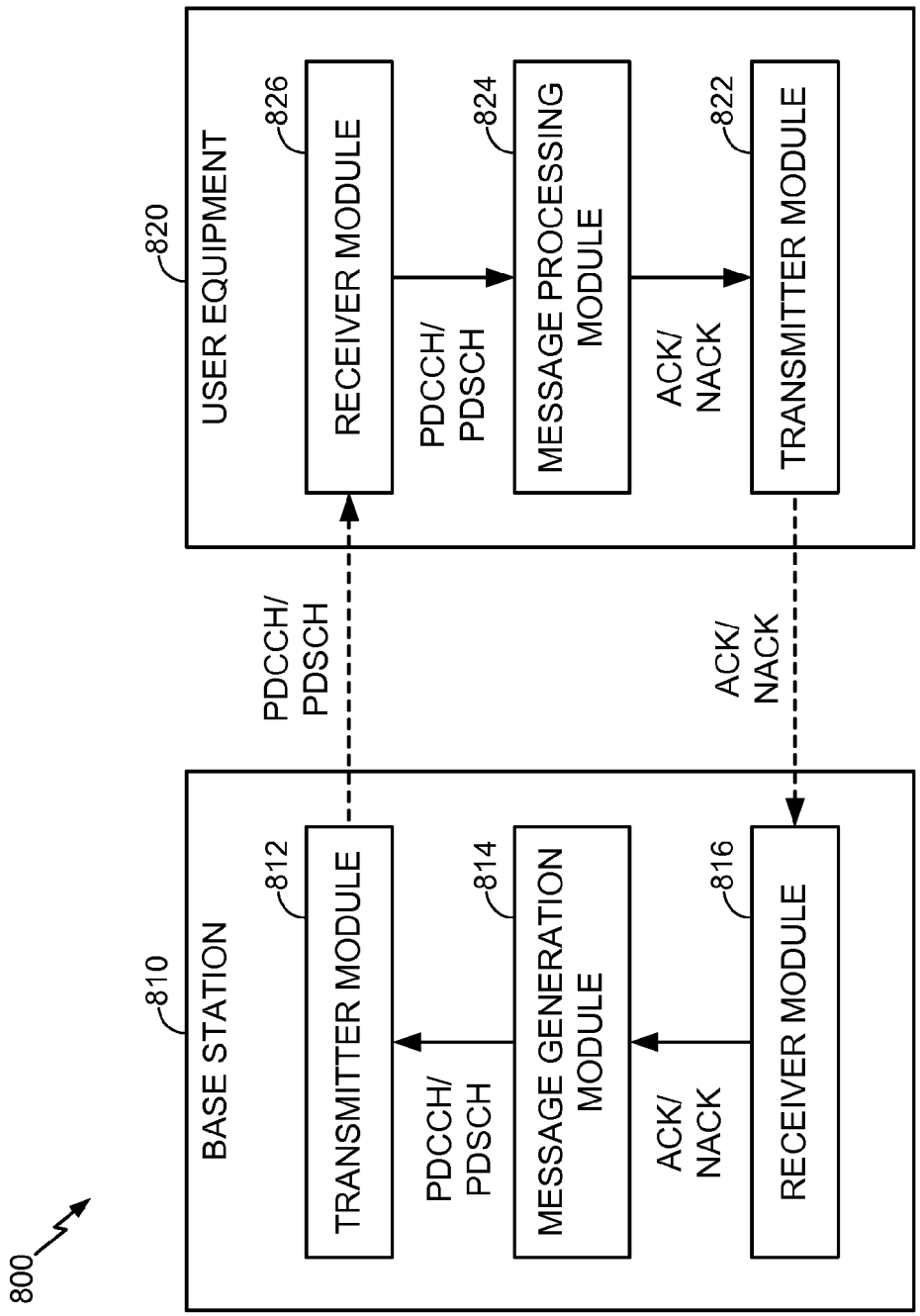
FIG. 8 illustrates an example system with a base station (BS) and UE, capable of avoiding ACK/NAK resource collisions, in accordance with certain aspects of the present disclosure.

FIG. 8 illustrates an example system 800 with a base station (BS) 810 (e.g., serving eNB) and UE 820, capable of avoiding ACK/NAK resource collisions, as will be discussed further herein. As illustrated, the BS 810 may include a message generation module 814 for generating PDCCHs assigning resources for a plurality of PDSCH transmissions in a common subframe, wherein the PDCCH may be transmitted, via a transmitter module 812, to the UE 820. The UE 820 may determine for a PDSCH transmission, a resource for use in transmitting an acknowledgment (ACK/NAK) of whether or not the PDSCH transmission was successfully received, in an effort to avoid ACK/NAK resource collisions.

The UE 820 may receive the PDCCH via a receiver module 826 and process the PDCCH via a message processing module 824. An acknowledgment may be generated by the UE 820 and transmitted, via a transmitter module 822, to the BS 810. In a subsequent and/or same subframe, the BS 810 may generate the PDSCH transmissions via the message generation module 814 and transmit the PDSCH transmissions, via the transmitter module 812, to the UE 820.

Figures 9, 10:
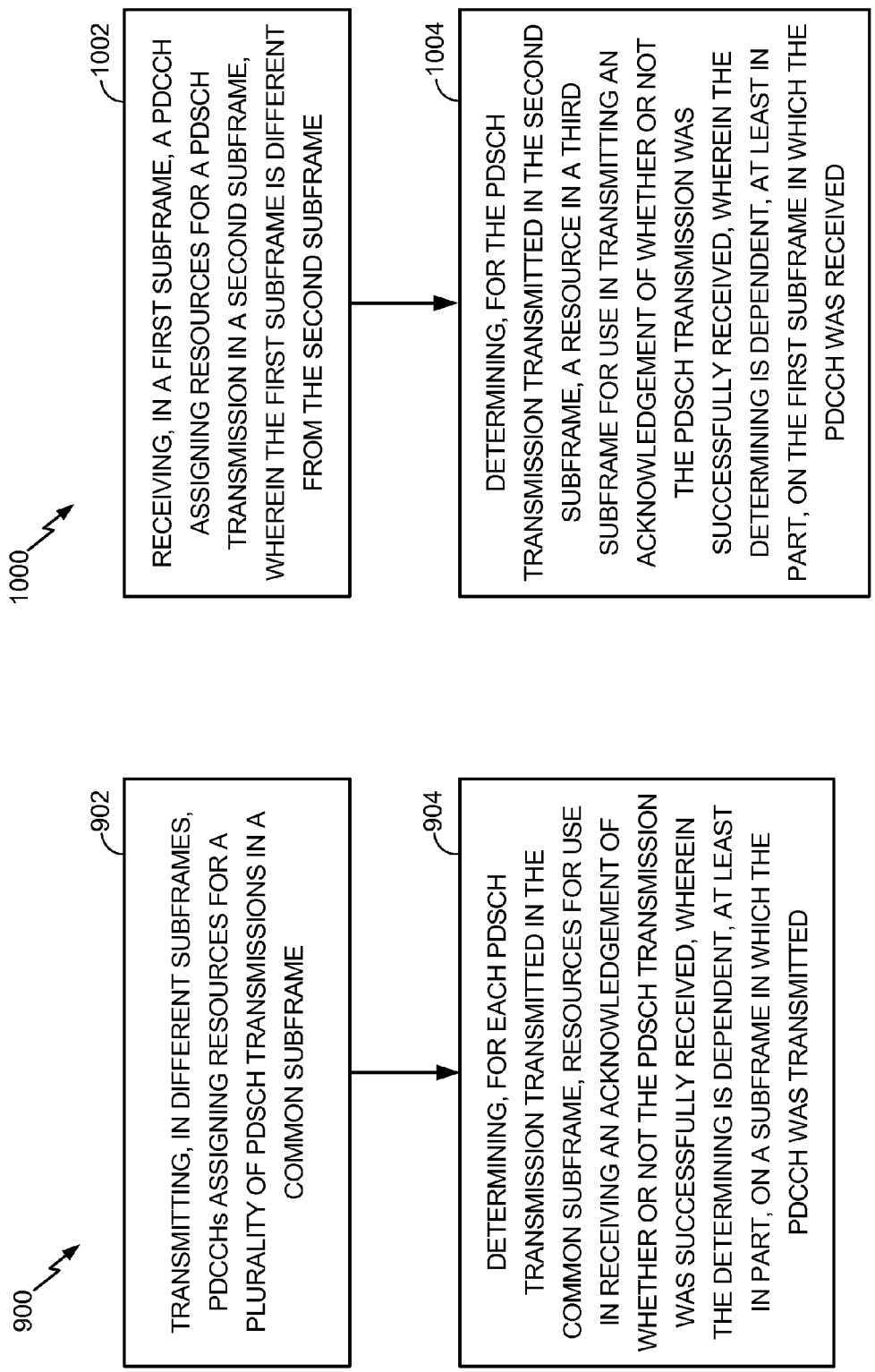
FIG. 9 illustrates example operations for determining resources for use in receiving an ACK/NAK for an associated PDSCH transmission in an effort to avoid ACK/NAK resource collisions, in accordance with certain aspects of the present disclosure.
FIG. 10 illustrates example operations for determining resources for use in transmitting an ACK/NAK for an associated PDSCH transmission in an effort to avoid ACK/NAK resource collisions, in accordance with certain aspects of the present disclosure.

FIG. 9 illustrates example operations 900 for determining resources for use in receiving an ACK/NAK for an associated PDSCH transmission in an effort to avoid ACK/NAK resource collisions, in accordance with certain aspects of the present disclosure. The operations 900 may be performed, for example, by a serving eNB.

At 902, the serving eNB may transmit, in different subframes, PDCCHs assigning resources for a plurality of PDSCH transmissions in a common subframe. For some embodiments, different control channel element (CCE) numbering may be used for different subframes in which PDCCHs are transmitted. For some embodiments, concatenated CCE numbering may be used over different PDCCH subframes. For some embodiments, at least partially overlapping CCE numbering may be used over different PDCCH subframes.

At 904, the serving eNB may determine, for each PDSCH transmission transmitted in the common subframe, resources for use in receiving an acknowledgement of whether or not the PDSCH transmission was successfully received, wherein the determining is dependent, at least in part, on a subframe in which the PDCCH was transmitted. For some embodiments, the resources to acknowledge the PDSCH transmissions may be determined based, at least in part, on starting CCE indices of corresponding PDCCHs and an offset. For some embodiments, the serving eNB may transmit explicit signaling indicating the resources to use for receiving the acknowledgments.

FIG. 10 illustrates example operations 1000 for determining resources for use in transmitting an ACK/NAK for an associated PDSCH transmission in an effort to avoid ACK/NAK resource collisions, in accordance with certain aspects of the present disclosure. The operations 1000 may be performed, for example, by a UE.

At 1002, the UE may receive, in a first subframe, a PDCCH assigning resources for a PDSCH transmission in a second subframe, wherein the first subframe is different from the second subframe.

At 1004, the UE may determine, for the PDSCH transmission transmitted in the second subframe, a resource in a third subframe for use in transmitting an acknowledgement of whether or not the PDSCH transmission was successfully received, wherein the determining is dependent, at least in part, on the first subframe in which the PDCCH was received. For some embodiments, there may be at least a 4 ms difference between the third subframe and the second subframe. For some embodiments, the UE may receive explicit signaling indicating the resource to use for transmitting the acknowledgment.

For PDSCHs of any given subframe n, the total number of possible subframes carrying PDCCH scheduling PDSCHs transmitted in subframe n may be denoted as K and the set of such PDCCH subframes may be denoted as $\{N_1, N_2, \ldots, N_K\}$. For example, referring to FIG. 7, the PDSCHs of subframe n+3 have PDCCH set $\{n, n+1, n+3\}$ and K=3. The number of CCEs for each of the PDCCH subframes in set K may be denoted as $\{N_{CCE1}, N_{CCE2}, \ldots, N_{CCEK}\}$. The number of CCEs for each subframe may depend on a number of factors, such as but not limited to, the number of control symbols configured for that subframe, the number of transmit antennas, or the number of resources used for a physical hybrid ARQ indicator channel (PHICH) for that subframe. The maximum number of CCEs may be denoted as $N_{CCE}^{Max}$. For some embodiments, $N_{CCE}^{Max}$ may be subframe-dependent.

For some embodiments, UEs that require cross-subframe signaling may not be required to decode physical control format indicator channels (PCFICHs) of subframes other than the subframes potentially carrying PDCCHs associated with a UE. Control signals in some subframes may not be reliable or available for the UEs (e.g., due to interference from strong/dominant interfering cells). Referring to FIG. 7, UE1 may not be required to decode the PCFICH in subframes n+1 and n+3 and, therefore, may not have knowledge of the actual number of CCEs in subframes n+1 and n+3. For other embodiments, the UEs may have knowledge of the number of CCEs of all PDCCH subframes in the PDCCH set for each PDSCH.

For some embodiments, independent CCE numbering may be used over different PDCCH subframes. For example, for each subframe in $\{N_1, N_2, \ldots, N_K\}$, the CCE numbering for subframe $N_1$ may be $1, 2, \ldots, N_{CCE1}$, the CCE numbering for subframe $N_2$ may be $1, 2, \ldots, N_{CCE2}$, and the CCE numbering for subframe $N_K$ may be 1, 2, . . . , $N_{CCEK}$. The ACK/NAK resource may then be mapped based on the starting CCE index of the corresponding PDCCH in the subframe and $N_{PUCCH}^{(1)}$. Independent CCE numbering over different PDCCH subframes may not require interaction between different PDCCH subframes. However, there may be scheduling limitations. For example, if a starting CCE is used by one PDCCH for a cross-subframe scheduled PDSCH transmission, the same starting CCE number may not be used for subsequent PDCCH subframes in the same PDCCH subframe set K. Therefore, an eNB may be required to consider PDCCH resource management over multiple subframes to minimize scheduling restrictions.

For some embodiments, an explicit ACK/NAK resource configuration may be performed. For example, a serving eNB may transmit explicit signaling indicating the resources to use for receiving the ACK/NAK. For some embodiments, the ACK/NAKs for PDSCH transmissions that are cross-subframe scheduled may be semi-statically configured (e.g., on a per UE basis). As an example, one single ACK/NAK resource may be configured semi-statically. As another example, multiple ACK/NAK resources (e.g. four) may be configured semi-statically and some bits may be embedded in the PDCCH to indicate to a UE which resource to use (i.e., similar to the SPS case). Explicit ACK/NAK resource configuration may not require interaction between different PDCCH subframes and there may be no PDCCH scheduling limitations. However, ACK/NAK resources may be wasted and at least layer 3 signaling may be required.

For some embodiments, implicit ACK/NAK resources with concatenated CCE numbering may be used over PDCCH subframes. For some embodiments, for each subframe in $\{N_1, N_2, \ldots, N_K\}$, the subframes may be ordered in increasing time (e.g., $N_1 \leq N_2$). As an example, the CCE numbering for subframe $N_K$ (i.e., the last subframe) may be: 1, 2, . . . , $N_{CCE}^{Max}$, the CCE numbering for subframe $N_{K-1}$ may be: $N_{CCE}^{Max}+1, N_{CCE}^{Max}+2, \ldots, 2*N_{CCE}^{Max}$, and the CCE numbering for subframe $N_1$ (i.e., the first subframe) may be: $(K-1)*N_{CCE}^{Max}+1, (K-1)*N_{CCE}^{Max}+2, \ldots, K*N_{CCE}^{Max}$. For some embodiments, the CCE numbering may start from 0 instead of 1. The ACK/NAK resource may then be mapped based on the starting CCE index of the corresponding PDCCH in the subframe and $N_{PUCCH}^{(1)}$. For some embodiments, no PDCCH scheduling restrictions are imposed and no signaling may be required. However, ACK/NAK resources may be wasted, for example, if the number of users being scheduled is small. For some embodiments, if the UEs have knowledge of the number of CCEs of all PDCCH subframes in the PDCCH set for each PDSCH, the actual number of CCEs per subframe may be used instead of $N_{CCE}^{Max}$.

Figure 11:
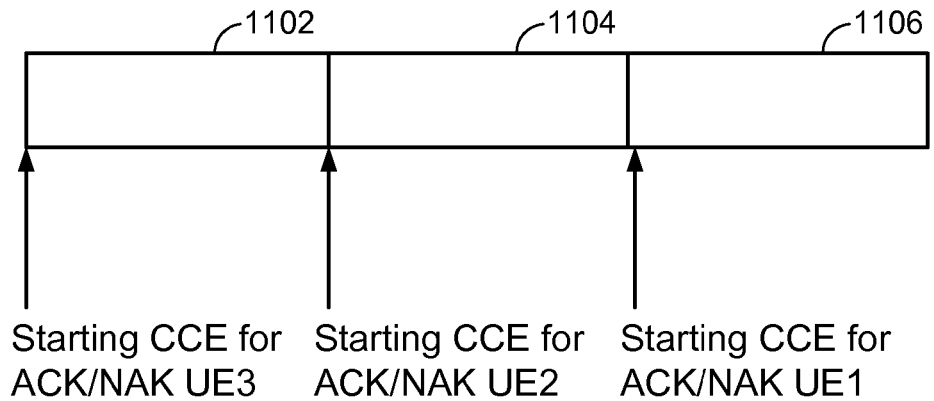
FIG. 11 illustrates concatenated CCE numbering for ACK/NAK resources derived for the plurality of UEs illustrated in FIG. 7, in accordance with certain aspects of the present disclosure.

FIG. 11 illustrates concatenated CCE numbering for ACK/NAK resources derived for the plurality of UEs illustrated in FIG. 7, in accordance with certain aspects of the present disclosure. For some embodiments, the ACK/NAK resources for different PDCCH subframes may not overlap. For example, by utilizing a fixed offset of, for example, $N_{CCE}^{Max}$, as described above, the CCE numbering may be concatenated over the PDCCH subframes. Assuming that the maximum number of CCEs ($N_{CCE}^{Max}$) is 80, the starting CCE for ACK/NAK UE3 1102 may be 1, the starting CCE for ACK/NAK UE2 1104 may be 81, and the starting CCE for ACK/NAK UE1 1106 may be 161.

Figure 12:
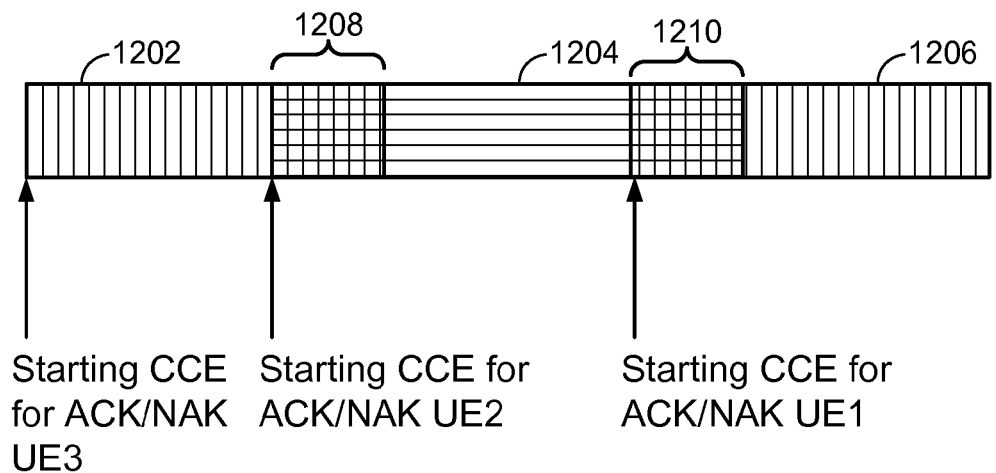
FIG. 12 illustrates partially overlapping ACK/NAK resources derived for the plurality of UEs illustrated in FIG. 7, in accordance with certain aspects of the present disclosure.

FIG. 12 illustrates partially overlapping ACK/NAK resources derived for the plurality of UEs illustrated in FIG. 7, in accordance with certain aspects of the present disclosure. For some embodiments, other fixed offsets may be chosen, resulting in partially overlapped ACK/NAK resources for different PDCCH subframes. For example, between subframes, a fixed offset of $N_{CCE}^{Max}/2$ may be used. As illustrated, resources for ACK/NAK UE3 1202 may overlap with resources for ACK/NAK UE2 1204 at 1208, and resources for ACK/NAK UE2 1204 may overlap with resources for ACK/NAK UE1 1206 at 1210. By partially overlapping ACK/NAK resources, resource wastage may be minimized while avoiding ACK/NAK resource collisions.

For some embodiments, a maximum number of ACK/NAK resources may be reserved for each subframe (e.g., 10), and then for each subframe, the ACK/NAK resource may be derived as $\mod(n_{CCE}, 10)$, where 10 resources are assumed and $n_{CCE}$ is the starting CCE index of a PDCCH. For some embodiments, the number of resources may also be signaled.

For some embodiments, implicit ACK/NAK resources with subframe-dependent offsets may be used. For example, for each subframe in $\{N_1, N_2, \ldots, N_K\}$, independent CCE numbering may be used over different PDCCH subframes, as described earlier. The ACK/NAK resource may then be mapped based on the starting CCE index of the corresponding PDCCH in the subframe, $N_{PUCCH}^{(1)}$, and subframe-dependent offsets. For same-subframe scheduling, the offset may be zero. For some embodiments, the offset may be chosen to provide a tradeoff between PDCCH scheduling flexibility and ACK/NAK resource overhead. In addition, a maximum number of ACK/NAK resources per PDCCH subframe may also be configured or hardcoded, and a modulo operation may be performed, as described earlier. Due to the flexible tradeoff between PDCCH scheduling flexibility and ACK/NAK resource overhead, a serving eNB may have more control. However, signaling may be required to indicate the offset, which may be semi-statically configured, although dynamic configuration may also be possible.

FIG. 13 illustrates example operations 1300 for determining resources for use in receiving an ACK/NAK for an associated PDSCH transmission in an effort to avoid ACK/NAK resource collisions, in accordance with certain aspects of the present disclosure. The operations 1300 may be performed, for example, by a serving eNB.

At 1302, the serving eNB may transmit, in different subframes, PDCCHs assigning resources for a plurality of PDSCH transmissions in a common subframe.

At 1304, the serving eNB may determine, for each PDSCH transmission transmitted in the common subframe, resources for use in receiving an acknowledgement of whether or not the PDSCH transmission was successfully received, wherein the determining is dependent, at least in part, on the common subframe in which the PDSCH transmission was transmitted. For some embodiments, the resources for use in receiving the ACK may be determined based on a starting physical resource block (PRB) index of a PDSCH transmission.

FIG. 14 illustrates example operations 1400 for determining resources for use in transmitting an ACK/NAK for an associated PDSCH transmission in an effort to avoid ACK/NAK resource collisions, in accordance with certain aspects of the present disclosure. The operations 1400 may be performed, for example, by a UE.

At 1402, the UE may receive, in a first subframe, a PDCCH assigning resources for a PDSCH transmission in a second subframe, wherein the first subframe is different from the second subframe.

At 1404, the UE may determine, for the PDSCH transmission transmitted in the second subframe, a resource for use in transmitting an acknowledgement of whether or not the PDSCH transmission was successfully received, wherein the determining is dependent, at least in part, on the second subframe in which the PDSCH transmission was received.

For some embodiments, instead of depending on a subframe in which a PDCCH was transmitted when determining ACK/NAK resources, cross-subframe based PDSCH transmissions may be used instead to derive the ACK/NAK resources. As an example, a starting physical resource block (PRB) index of an assigned PDSCH may be used to derive the ACK/NAK resource. In an effort to save the ACK/NAK resource overhead, a limited number of ACK/NAK resources may be configured to carry ACK/NAKs for cross-subframe scheduled PDSCH transmissions. For example, where 18 ACK/NAKs may be configured, ACK/NAK resources for a cross-subframe scheduled PDSCH transmission may be derived by $mod(N_{PRB}, 18)$, where $N_{PRB}$ is the starting PRB index of the PDSCH transmission. Limiting the number of ACK/NAK resources that is configured to carry ACK/NAKs for cross-subframe scheduled PDSCH transmission may allow a tradeoff between overhead and flexibility. For some embodiments, the ACK/NAK resources may be derived for same-subframe scheduled PDSCH transmissions.

For some embodiments, additional bits in the PDCCH may be used to provide an additional offset for ACK/NAK resource derivation (e.g., if two UEs have the same starting PRB), similar to the usage of a demodulation reference signal (DM-RS) in a PHICH resource derivation. Using the additional bits in PDCCH may provide additional flexibility in ACK/NAK resource derivation and, therefore, a smaller chance of ACK/NAK resource collision.

ACK/NAK resource derivation may be performed standalone or combined by any of the embodiments described above. ACK/NAK resource derivation may be applicable to both FDD and TDD systems. For some embodiments, a PDSCH transmission may be scheduled by two PDCCHs (e.g., for reliability). From the UE perspective, the UE may use the latest detected PDCCH for ACK/NAK resource determination.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications, comprising:
transmitting, in different subframes physical downlink control channels (PDCCHs) assigning resources for a plurality of physical downlink shared channel (PDSCH) transmissions in a common subframe, wherein at least partially overlapping control channel element (CCE) numbering is used over different PDCCH subframes; and
determining, for each PDSCH transmission transmitted in the common subframe, resources for use in receiving an acknowledgement (ACK) of whether or not the PDSCH transmission was successfully received, wherein the determining is dependent, at least in part, on a subframe in which the PDCCH was transmitted.

2. The method of claim 1, wherein different control channel element (CCE) numbering is used for different subframes in which PDCCHs are transmitted.

3. The method of claim 2, wherein concatenated CCE numbering is used over different PDCCH subframes.

4. The method of claim 1, further comprising transmitting signaling indicating the determined resources to use for receiving the ACK.

5. The method of claim 1, wherein the resources to receive the ACK of the each of the plurality of PDSCH transmissions are determined based, at least in part, on starting CCE indices of corresponding PDCCHs and an offset.

6. An apparatus for wireless communications, comprising:
means for transmitting, in different subframes, physical downlink control channels (PDCCHs) assigning resources for a plurality of physical downlink shared channel (PDSCH) transmissions in a common subframe, wherein at least partially overlapping control channel element (CCE) numbering is used over different PDCCH subframes; and
means for determining, for each PDSCH transmission transmitted in the common subframe, resources for use in receiving an acknowledgement (ACK) of whether or not the PDSCH transmission was successfully received, wherein the determining is dependent, at least in part, on a subframe in which the PDCCH was transmitted.

7. The apparatus of claim 6, wherein different control channel element (CCE) numbering is used for different subframes in which PDCCHs are transmitted.

8. The apparatus of claim 7, wherein concatenated CCE numbering is used over different PDCCH subframes.

9. The apparatus of claim 6, further comprising means for transmitting signaling indicating the determined resources to use for receiving the ACK.

10. The apparatus of claim 6, wherein the resources to receive the ACK of the each of the plurality of PDSCH transmissions are determined based, at least in part, on starting CCE indices of corresponding PDCCHs and an offset.

11. An apparatus for wireless communications, comprising:
at least one processor configured to transmit, in different subframes, physical downlink control channels (PDCCHs) assigning resources for a plurality of physical downlink shared channel (PDSCH) transmissions in a common subframe, wherein at least partially overlapping control channel element (CCE) numbering is used over different PDCCH subframes, and determine, for each PDSCH transmission transmitted in the common subframe, resources for use in receiving an acknowledgement (ACK) of whether or not the PDSCH transmission was successfully received, wherein the determining is dependent, at least in part, on a subframe in which the PDCCH was transmitted.

12. The apparatus of claim 11, wherein different control channel element (CCE) numbering is used for different subframes in which PDCCHs are transmitted.

13. The apparatus of claim 12, wherein concatenated CCE numbering is used over different PDCCH subframes.

14. The apparatus of claim 11, wherein the at least one processor is configured to transmit signaling indicating the determined resources to use for receiving the ACK.

15. The apparatus of claim 11, wherein the resources to receive the ACK of the each of the plurality of PDSCH transmissions are determined based, at least in part, on starting CCE indices of corresponding PDCCHs and an offset.

16. A computer-program product, comprising:
a non-transitory computer-readable medium comprising:
code for transmitting, in different subframes, physical downlink control channels (PDCCHs) assigning resources for a plurality of physical downlink shared channel (PDSCH) transmissions in a common subframe, wherein at least partially overlapping control channel element (CCE) numbering is used over different PDCCH subframes; and
code for determining, for each PDSCH transmission transmitted in the common subframe, resources for use in receiving an acknowledgement (ACK) of whether or not the each PDSCH transmission was successfully received, wherein the determining is dependent, at least in part, on a subframe in which the PDCCH was transmitted.

17. The computer-program product of claim 16, wherein different control channel element (CCE) numbering is used for different subframes in which PDCCHs are transmitted.

18. The computer-program product of claim 17, wherein concatenated CCE numbering is used over different PDCCH subframes.

19. The computer-program product of claim 16, further comprising code for transmitting signaling indicating the determined resources to use for receiving the ACK.

20. The computer-program product of claim 16, wherein the resources to receive the ACK of the each of the plurality of PDSCH transmissions are determined based, at least in part, on starting CCE indices of corresponding PDCCHs and an offset.

21. A method for wireless communications, comprising:
transmitting, in different subframes, physical downlink control channels (PDCCHs) assigning resources for a plurality of physical downlink shared channel (PDSCH) transmissions in a common subframe, wherein at least partially overlapping control channel element (CCE) numbering is used over different PDCCH subframes; and
determining, for each PDSCH transmission transmitted in the common subframe, resources for use in receiving an acknowledgement (ACK) of whether or not the PDSCH transmission was successfully received, wherein the determining is dependent, at least in part, on the common subframe in which the PDSCH transmission was transmitted.

22. The method of claim 21, wherein the resources for use in receiving the ACK is determined based on a starting physical resource block (PRB) index of a PDSCH transmission.

23. An apparatus for wireless communications, comprising:
means for transmitting, in different subframes, physical downlink control channels (PDCCHs) assigning resources for a plurality of physical downlink shared channel (PDSCH) transmissions in a common subframe, wherein at least partially overlapping control channel element (CCE) numbering is used over different PDCCH subframes; and means for determining, for each PDSCH transmission transmitted in the common subframe, resources for use in receiving an acknowledgement (ACK) of whether or not the each PDSCH transmission was successfully received, wherein the determining is dependent, at least in part, on the common subframe in which the PDSCH transmission was transmitted.

24. The apparatus of claim 23, wherein the resources for use in receiving the ACK is determined based on a starting physical resource block (PRB) index of a PDSCH transmission.

25. An apparatus for wireless communications, comprising:

at least one processor configured to transmit, in different subframes, physical downlink control channels (PDCCHs) assigning resources for a plurality of physical downlink shared channel (PDSCH) transmissions in a common subframe, wherein at least partially overlapping control channel element (CCE) numbering is used over different PDCCH subframes, and determine, for each PDSCH transmission transmitted in the common subframe, resources for use in receiving an acknowledgement (ACK) of whether or not the PDSCH transmission was successfully received, wherein the determining is dependent, at least in part, on the common subframe in which the PDSCH transmission was transmitted.

26. The apparatus of claim 25, wherein the resources for use in receiving the ACK is determined based on a starting physical resource block (PRB) index of a PDSCH transmission.

27. A computer-program product, comprising:
a non-transitory computer-readable medium comprising:
code for transmitting, in different subframes, physical downlink control channels (PDCCHs) assigning resources for a plurality of physical downlink shared channel (PDSCH) transmissions in a common subframe, wherein at least partially overlapping control channel element (CCE) numbering is used over different PDCCH subframes; and
code for determining, for each PDSCH transmission transmitted in the common subframe, resources for use in receiving an acknowledgement (ACK) of whether or not each the PDSCH transmission was successfully received, wherein the determining is dependent, at least in part, on the common subframe in which the PDSCH transmission was transmitted.

28. The computer-program product of claim 27, wherein the resources for use in receiving the ACK is determined based on a starting physical resource block (PRB) index of a PDSCH transmission.

29. A method for wireless communications, comprising:
receiving, in a first subframe, a physical downlink control channel (PDCCH) assigning resources for a physical downlink shared channel (PDSCH) transmission in a second subframe, wherein the first subframe is different from the second subframe, wherein at least partially overlapping control channel element (CCE) numbering is used over different PDCCH subframes; and determining, for the PDSCH transmission transmitted in the second subframe, a resource in a third subframe for use in transmitting an acknowledgement (ACK) of whether or not the PDSCH transmission was successfully received, wherein the determining is dependent, at least in part, on the first subframe in which the PDCCH was received.

30. The method of claim 29, wherein independent control channel element (CCE) numbering is used for different subframes in which PDCCHs are received.

31. The method of claim 30, wherein concatenated CCE numbering is used over different PDCCH subframes for a common PDSCH subframe.

32. The method of claim 29, further comprising receiving explicit signaling indicating the resource to use for transmitting the ACK.

33. The method of claim 29, wherein the resource to ACK the PDSCH transmission is determined based, at least in part, on a starting CCE index of the PDCCH and an offset.

34. The method of claim 29, wherein there is at least a 4 ms difference between the third subframe and the second subframe.

35. An apparatus for wireless communications, comprising:
means for receiving, in a first subframe, a physical downlink control channel (PDCCH) assigning resources for a physical downlink shared channel (PDSCH) transmission in a second subframe, wherein the first subframe is different from the second subframe, wherein at least partially overlapping control channel element (CCE) numbering is used over different PDCCH subframes; and means for determining, for the PDSCH transmission transmitted in the second subframe, a resource in a third subframe for use in transmitting an acknowledgement (ACK) of whether or not the PDSCH transmission was successfully received, wherein the determining is dependent, at least in part, on the first subframe in which the PDCCH was received.

36. The apparatus of claim 35, wherein independent control channel element (CCE) numbering is used for different subframes in which PDCCHs are received.

37. The apparatus of claim 36, wherein concatenated CCE numbering is used over different PDCCH subframes for a common PDSCH subframe.

38. The apparatus of claim 35, further comprising means for receiving signaling indicating the resource to use for transmitting the ACK.

39. The apparatus of claim 35, wherein the resource to ACK the PDSCH transmission is determined based, at least in part, on a starting CCE index of the PDCCH and an offset.

40. The apparatus of claim 35, wherein there is at least a 4 ms difference between the third subframe and the second subframe.

41. An apparatus for wireless communications, comprising:
at least one processor configured to receive, in a first subframe, a physical downlink control channel (PDCCH) assigning resources for a physical downlink shared channel (PDSCH) transmission in a second subframe, wherein the first subframe is different from the second subframe, wherein at least partially overlapping control channel element (CCE) numbering is used over different PDCCH subframes, and determine, for the PDSCH transmission transmitted in the second subframe, a resource in a third subframe for use in transmitting an acknowledgement (ACK) of whether or not the PDSCH transmission was successfully received, wherein the determining is dependent, at least in part, on the first subframe in which the PDCCH was received.

42. The apparatus of claim 41, wherein independent control channel element (CCE) numbering is used for different subframes in which PDCCHs are received.

43. The apparatus of claim 42, wherein concatenated CCE numbering is used over different PDCCH subframes for a common PDSCH subframe.

44. The apparatus of claim 41, wherein at least one processor is configured to receive signaling indicating the resource to use for transmitting the ACK.

45. The apparatus of claim 41, wherein the resource to ACK the PDSCH transmission is determined based, at least in part, on a starting CCE index of the PDCCH and an offset.

46. The apparatus of claim 41, wherein there is at least a 4 ms difference between the third subframe and the second subframe.

47. A computer-program product, comprising:
a non-transitory computer-readable medium comprising:
code for receiving, in a first subframe, a physical downlink control channel (PDCCH) assigning resources for a physical downlink shared channel (PDSCH) transmission in a second subframe, wherein the first subframe is different from the second subframe, wherein at least partially overlapping control channel element (CCE) numbering is used over different PDCCH subframes; and
code for determining, for the PDSCH transmission transmitted in the second subframe, a resource in a third subframe for use in transmitting an acknowledgement (ACK) of whether or not the PDSCH transmission was successfully received, wherein the determining is dependent, at least in part, on the first subframe in which the PDCCH was received.

48. The computer-program product of claim 47, wherein independent control channel element (CCE) numbering is used for different subframes in which PDCCHs are received.

49. The computer-program product of claim 48, wherein concatenated CCE numbering is used over different PDCCH subframes for a common PDSCH subframe.

50. The computer-program product of claim 47, further comprising code for receiving signaling indicating the resource to use for transmitting the ACK.

51. The computer-program product of claim 47, wherein the resource to ACK the PDSCH transmission is determined based, at least in part, on a starting CCE index of the PDCCH and an offset.

52. The computer-program product of claim 47, wherein there is at least a 4 ms difference between the third subframe and the second subframe.

53. A method for wireless communications, comprising:
receiving, in a first subframe, a physical downlink control channel (PDCCH) assigning resources for a physical downlink shared channel (PDSCH) transmission in a second subframe, wherein at least partially overlapping control channel element (CCE) numbering is used over different PDCCH subframes; and
determining, for the PDSCH transmission transmitted in the second subframe, a resource for use in transmitting an acknowledgement (ACK) of whether or not the PDSCH transmission was successfully received, wherein the determining is dependent, at least in part, on the second subframe in which the PDSCH transmission was received.

54. The method of claim 53, wherein the resource for use in transmitting the ACK is determined based on a starting physical resource block (PRB) index of the PDSCH transmission.

55. An apparatus for wireless communications, comprising:
means for receiving, in a first subframe, a physical downlink control channel (PDCCH) assigning resources for a physical downlink shared channel (PDSCH) transmission in a second subframe, wherein at least partially overlapping control channel element (CCE) numbering is used over different PDCCH subframes; and
means for determining, for the PDSCH transmission transmitted in the second subframe, a resource for use in transmitting an acknowledgement (ACK) of whether or not the PDSCH transmission was successfully received, wherein the determining is dependent, at least in part, on the second subframe in which the PDSCH transmission was received.

56. The apparatus of claim 55, wherein the resource for use in transmitting the ACK is determined based on a starting physical resource block (PRB) index of the PDSCH transmission.

57. An apparatus for wireless communications, comprising:
at least one processor configured to receive, in a first subframe, a physical downlink control channel (PDCCH) assigning resources for a physical downlink shared channel (PDSCH) transmission in a second subframe, wherein at least partially overlapping control channel element (CCE) numbering is used over different PDCCH subframes, and determine, for the PDSCH transmission transmitted in the second subframe, a resource for use in transmitting an acknowledgement (ACK) of whether or not the PDSCH transmission was successfully received, wherein the determining is dependent, at least in part, on the second subframe in which the PDSCH transmission was received.

58. The apparatus of claim 57, wherein the resource for use in transmitting the ACK is determined based on a starting physical resource block (PRB) index of the PDSCH transmission.

59. A computer-program product, comprising:
a non-transitory computer-readable medium comprising:
code for receiving, in a first subframe, a physical downlink control channel (PDCCH) assigning resources for a physical downlink shared channel (PDSCH) transmission in a second subframe, wherein at least partially overlapping control channel element (CCE) numbering is used over different PDCCH subframes; and
code for determining, for the PDSCH transmission transmitted in the second subframe, a resource for use in transmitting an acknowledgement (ACK) of whether or not the PDSCH transmission was successfully received, wherein the determining is dependent, at least in part, on the second subframe in which the PDSCH transmission was received.

60. The computer-program product of claim 59, wherein the resource for use in transmitting the ACK is determined based on a starting physical resource block (PRB) index of the PDSCH transmission.

* * * * *